United States Patent [19]

Lackman

[11] Patent Number: 5,012,685
[45] Date of Patent: May 7, 1991

[54] BALL VALVE SEAT DISTANCE MEASURING DEVICE AND METHOD OF USING SAME

[76] Inventor: Mark B. Lackman, 717 Oleander Cir., Virginia Beach, Va. 23464

[21] Appl. No.: 490,434

[22] Filed: Mar. 8, 1990

[51] Int. Cl.⁵ ............................................. G01D 21/00
[52] U.S. Cl. ...................................... 73/866.5; 33/654
[58] Field of Search .............................. 73/866.5, 865.9; 33/783–786, 792–794, 542, 832, 833, 838, 613, 644, 654

[56] References Cited

U.S. PATENT DOCUMENTS 4,288,924 9/1981 Mizuno et al. .......................... 33/794

FOREIGN PATENT DOCUMENTS 0838300 6/1981 U.S.S.R. ................................. 33/783

Primary Examiner—Robert Raevis
Attorney, Agent, or Firm—Griffin Branigan & Butler

[57] ABSTRACT

A device for measuring the average distance between the ball retainer seating rings of a ball valve comprises a flat locator plate adapted to fit into the bonnet recess of the valve body, and a downwardly depending support arm attached to the flat plate. The support arm has a first surface perpendicular to the bottom surface of the plate and a second, opposing surface which is at an angle greater than 90 degrees relative to the bottom surface of the plate. The support arm is attached to the locator plate in a position such that when the locator plate is positioned in the bonnet recess the first surface coincides with the axis of the valve body. In one embodiment, probes are threaded and extend from threaded holes in the depending arm in a direction normal to the second surface of the arm. Thumbwheels attached to the probes are utilized to adjust the probes. In a second embodiment each probe is attached to a spring loaded probe drive element within the depending arm. Locking rods carrying cams are operated from control knobs located above the flat plate to lock the probes in position.

15 Claims, 3 Drawing Sheets

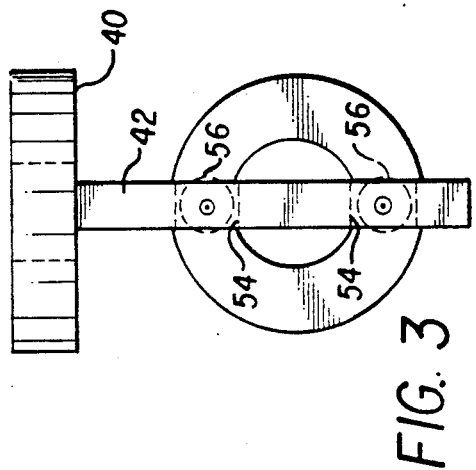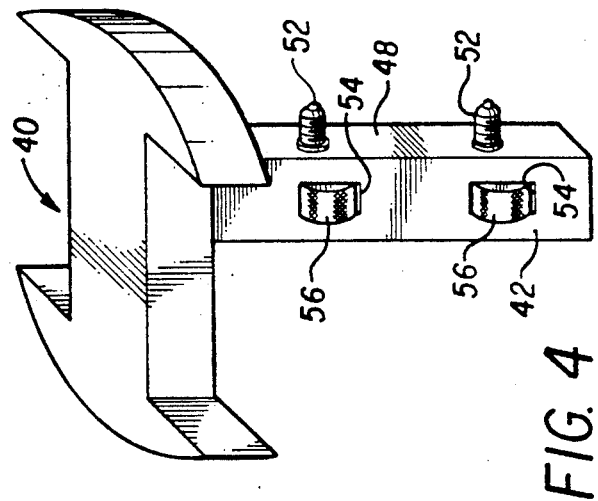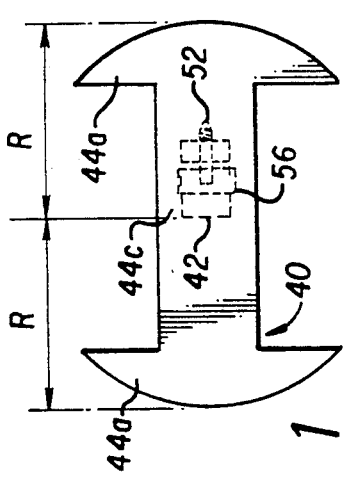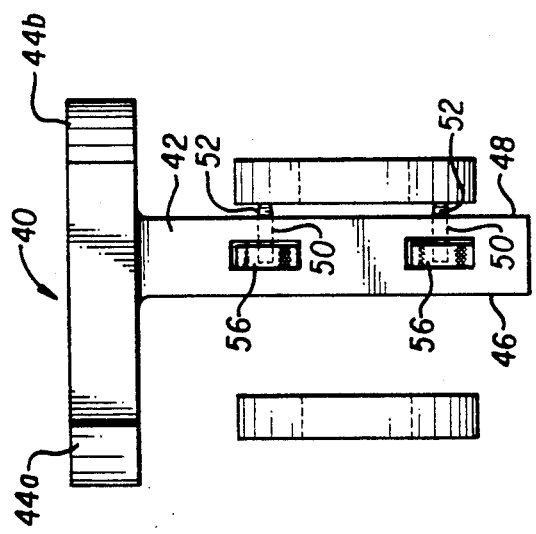

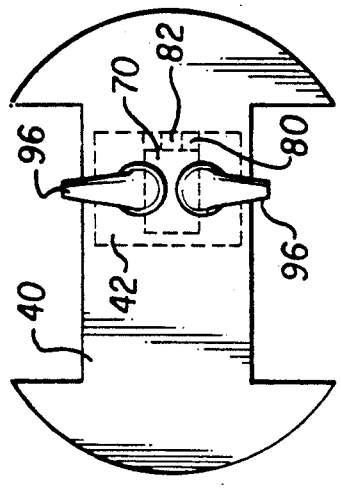
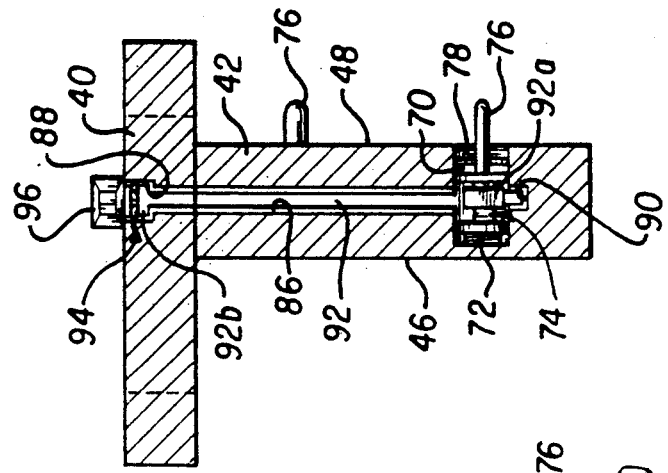
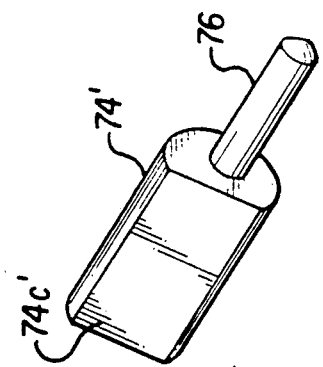
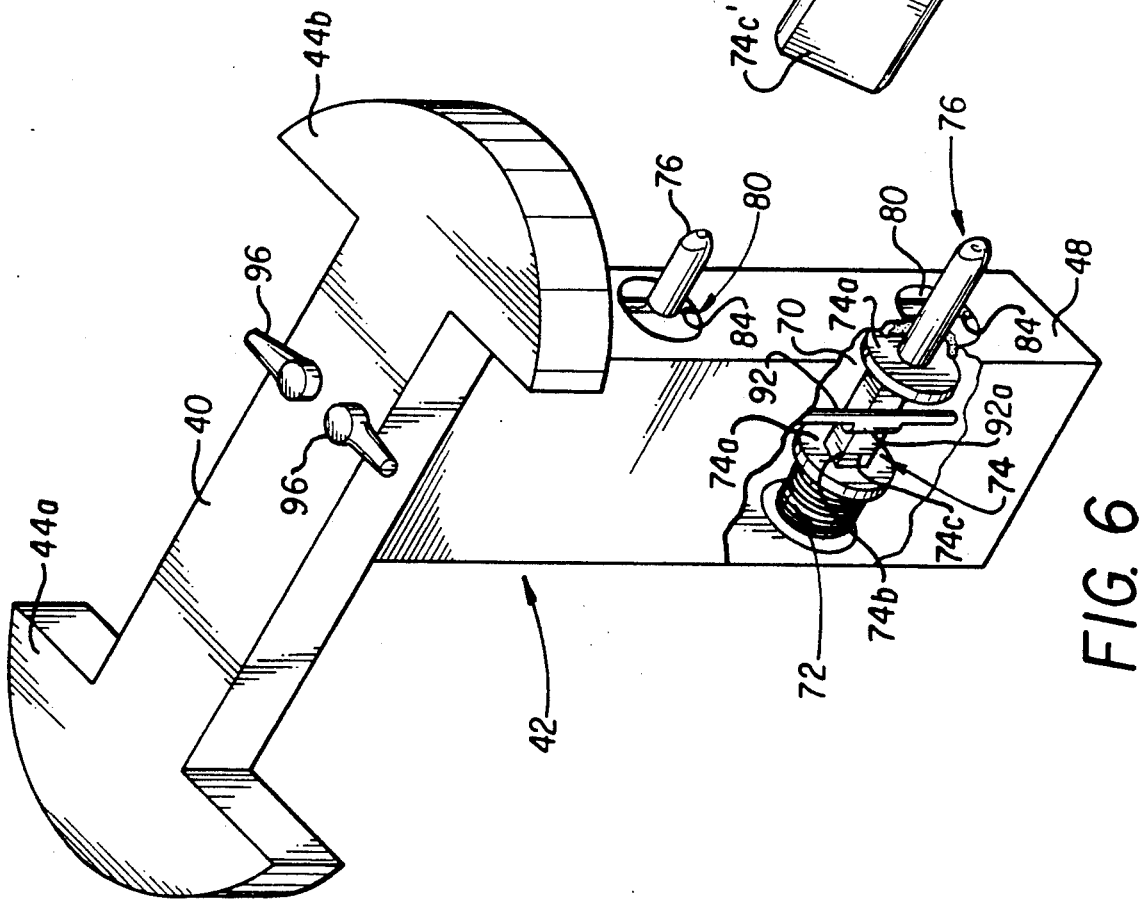

BALL VALVE SEAT DISTANCE MEASURING DEVICE AND METHOD OF USING SAME

BACKGROUND OF THE INVENTION

The present invention relates to measuring devices and more particularly to measuring devices for determining the average distance between the ball retainer seating rings of a ball valve.

Heretofore inside calipers have been utilized to measure the distance between the ball retainer seating rings of a ball valve. The measurement is accomplished by removing the valve bonnet, ball, ball retainers and other operating mechanisms within the valve body. The calipers are then inserted into the valve body and adjusted until the probes or tips of the calipers touch the opposing faces of the two ball retainer seating rings. Because the opposing faces of the seating rings are not in parallel planes, the measurement is inaccurate if the probes do not contact the surfaces at points such that an imaginary line extending through the points of contact is parallel to the axis of the inlet and outlet bores of the valve. This means that the points of contact must be precisely the same in both the X and Y directions relative to the axis thus making the measurement difficult.

SUMMARY OF THE INVENTION

An object of the present invention is to provide a novel apparatus for measuring the average distance between seating rings in a ball valve and a novel method of using the apparatus to determine the average distance between seating rings.

An object of the present invention is to provide a measuring device for measuring the distance between seating rings in a ball valve body having a circular bonnet recess, the measuring device comprising a locator plate dimensioned to fit within the bonnet recess without play, a support arm depending from the locator plate so as to extend into the valve body when the locator plate is positioned in the bonnet recess, first and second probes supported by the support arm and movable relative to the support arm, and means for moving the probes into contact with a seating ring at first and second points.

An object of the invention is to provide a measuring device as described above wherein the support arm has a first planar surface extending normal to the plane of the locator plate and a second opposing planar surface which is not normal to the plane of a locator plate, the support arm being affixed to the locator plate such that when the locator plate is positioned in the bonnet recess, the axis of the recess coincides with the plane of the first planar surface.

In a first embodiment the probes are threaded and mounted in the threaded holes in the support arm so as to extend in a direction normal to the second planar surface of the support arm. Each probe is provided with a thumbwheel for adjusting the probe and the thumbwheels are accessible through openings between the valve body and the locator plate.

In a second embodiment, each probe is attached to a probe drive element positioned in a chamber in the support arm and a spring applies a bias force to the drive element in a direction tending to extend the probe from the support arm. A control rod is provided for each probe, each control rod having an operating handle above the locator plate and cam positioned in one of the chambers for locking the probe drive element against movement.

A further object of the invention is to provide a novel method of determining the average distance between two seating rings in a ball valve body having a circular bonnet recess extending symmetrically around an axis of the valve body the method comprising the steps of: positioning in the bonnet recess a measuring device having a support arm extending into the valve body and supporting two manually adjustable probes movable into simultaneous contact with one of the seating rings, the support arm having a planar surface which coincides with the valve axis when the measuring device is positioned in the bonnet recess, adjusting the probes until an end of each probe contacts the one seating ring, removing the measuring device from the valve body, measuring the distance between the end of each probe and the planar surface of the support arm, positioning the measuring device in the bonnet recess with the probes pointing toward the other seating ring, adjusting the probes until an end of each probe contacts the other seating ring, again removing the measuring device from the valve body and measuring the distance between the end of each probe and the planar surface of the support arm, and determining from all the measured distances the average distance between the two seating rings.

Other objects of the invention and its mode of operation will become apparent upon consideration of the following description and the accompanying drawing.

BRIEF DESCRIPTION OF THE DRAWINGS

FIG. 1 is a top view of a first embodiment of a ball valve seat distance measuring device constructed in accordance with the principles of the present invention;

FIG. 2 is a front elevation of FIG. 1 showing the measuring device positioned relative to a valve seating ring;

FIG. 3 is a side view of the measuring device positioned relative to a valve seating ring;

FIG. 4 is a perspective view of the measuring device;

FIG. 6 is a perspective view, partially cut away, illustrating a second embodiment of the measuring device;

FIG. 7 is a top view of the second embodiment;

FIG. 8 is a sectional view illustrating a probe locking mechanism; and,

FIG. 9 illustrates an alternate embodiment of a probe drive element.

DETAILED DESCRIPTION OF THE INVENTION

Figure 5:
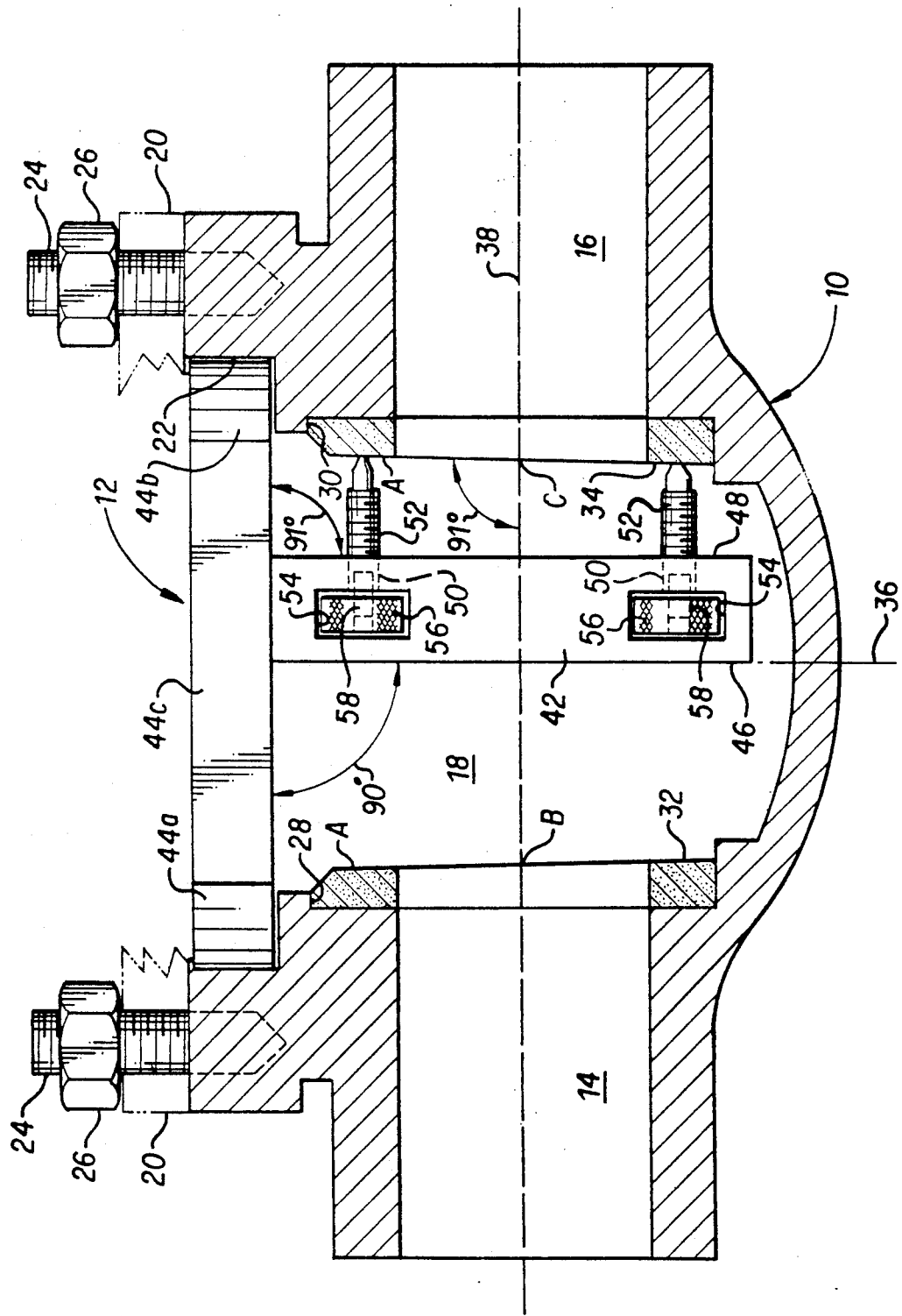
FIG. 5 is a part sectional view showing the measuring device positioned on a valve body.

FIG. 5 is a sectional view of a conventional ball valve body 10 having a ball valve seat distance measuring device 12 mounted therein. The valve body has axially aligned inlet and outlet bores 14 and 16 and a central region 18 wherein a ball element (not shown) is normally positioned. The valve body is provided with a valve bonnet 20, partially shown in broken lines, which must be removed to gain access to the region 18. As is conventional in ball valves, the bonnet supports a ball and valve actuating mechanism (not shown).

The top of the valve body has a circular recess 22 symmetrically located with respect to the vertical axis 36 of the valve body. The recess 22 normally receives a closely fitting circular and downwardly extending portion of the bonnet so as to precisely locate the bonnet relative to the valve body. Threaded studs 24 and nuts 26 normally hold the bonnet 20 securely on the valve body 10. The valve body 10 is provided with two annular recesses 28 and 30 and two ring-shaped ball retainer seating rings 32 and 34 are mounted in the recesses 28 and 30, respectively. To facilitate removal of the ball and other valve parts, the annular surfaces A of the seating rings lie in planes which diverge upwardly at one degree angles with respect to the vertical center line 36 of the valve body. Therefore, the planes of surfaces A are not perpendicular to the horizontal axis 38 of the inlet and outlet bores 14 and 16 but are oriented at a 91 degree angle with respect to this axis.

The purpose of a ball valve seat distance measuring device constructed in accordance with the principles of the present invention is to enable determination of the distance between point B where the plane of surface A of seating ring 32 intersects axis 38 and the point C where the plane of surface A of seating ring 34 intersects axis 38.

As shown in FIGS. 1–4, the measuring device comprises a generally flat locator plate 40 having a downwardly depending support arm 42. The plate 40 may be visualized as a circle from which two portions have been removed so as to leave two chordal portions 44a, 44b joined by a bar-like central portion 44c as illustrated in FIG. 1. The radius of curvature R of the chordal portions 44a, 44b is made slightly less than the radius of the bonnet recess 22 (FIG. 5) in the ball valve body so that the plate 40 fits into the recess without play.

As best shown in FIG. 5, support arm 42 has a first surface 46 which is perpendicular to plate 40 and an opposing surface 48 which makes an angle of 91 degrees with the plate 40. The support arm 42 is attached to the bar-like portion 44c of the locator plate 40 at a position which is offset toward the chordal portion 44b so that when the measuring device is put into measuring position on the valve body the surface 48 is parallel to, but spaced apart from, the plane of the surface A of seating ring 34 and the surface 46 coincides with the vertical axis 36 of the valve body. If the measuring device is removed from the valve body, rotated 180 degrees relative to the position shown in FIG. 5, and then repositioned on the valve body the surface 46 will again coincide with the axis 36 of the valve body and the surface 48 will be parallel to, but offset from, the plane of surface A of the seating ring 32.

The support arm 42 is provided with two holes 50 extending perpendicularly to the surface 48. The holes 50 are internally threaded for receiving a respective one of two threaded probes 52. The holes 50 intersect two through-holes 54 provided in arm 42 for receiving two knurled thumbwheels 56. The probes 52 are provided with square shanks 58 at their left ends (as viewed in FIG. 5) and thumbwheels 56 are provided with square holes for slidingly receiving the shanks. A probe 52 is screwed into a hole 50 while a thumbwheel 56 is held in position for receiving the square shank 50. When the probe is screwed to a certain point, its shank 58 slides into the hole in the thumbwheel. Further rotation of the probe causes rotation of the thumbwheel together with sliding movement of the thumbwheel along the shank 58 of the probe. Once a probe and thumbwheel have been assembled in this manner, the distance by which the probe extends beyond surface 48 may be changed by rotating the associated thumbwheel even though lateral movement of the thumbwheel is limited by the walls of through-hole 54.

Referring to FIG. 5, the ball valve seat distance measuring device is used as follows. First, the nuts 26 and the bonnet 20, the ball, and internal mechanism of the valve are all removed. Next, with the probes 52 partially withdrawn into the arm 42, the measuring device is inserted into the valve body with the locator plate 40 resting in the circular recess 22 and the probes 52 pointing toward surface A of seating ring 34. At this time it will be evident that two holes exist between the bar-like portion 44c of plate 40 and the body of the valve so that a person's finger or fingers may be inserted into the valve body to rotate the thumbwheels 56. First one and then the other thumbwheel is turned until its associated probe 52 barely contacts surface A of seating ring 34. The device 12 is then rotated slightly by applying finger pressure to the bar-like portion 44c of plate 40 so that the probes 52 are rotated away from the surface of seating ring 34. The device may then be lifted out of the valve body by grasping the bar-like portion 44c.

After the measuring device 12 is removed from the valve body 10, an outside micrometer caliper is used to measure the distance from the end of each probe 52 to the surface 46. Both measurements are noted and the device 12 is again inserted into the valve body, this time with the probes 52 pointing toward surface A of seating ring 32. The thumbwheels 56 are turned until their tips just touch surface A of seating ring 32, the measuring device 12 is rotated slightly so that the probes clear the seating ring 32, and the measuring device is again removed from the valve body. The distance from the tip of each probe 52 to the surface 46 is again measured using the micrometer caliper. These two measurements are then added to the prior measurements and the sum divided by two. The result is the distance between points B and C, the average distance between the surfaces A of seating rings 32 and 34.

Measurement of the ball valve seat distance is greatly simplified and, as compared to prior art devices, more accurate measurements may be made using the first embodiment of the measuring device as illustrated in FIGS. 1–5. However, the user must be able to get a finger or fingers into the valve body to turn the thumbwheels 56, and since the openings between the bar-like portion 44c of plate 40 and the inner periphery of the valve body is smaller for smaller valves, measurement of the ball valve seating ring distance becomes more difficult for smaller valves. A second embodiment overcomes this problem.

As illustrated in FIGS. 6–8 the second embodiment also includes a locator plate 40 and a downwardly depending support arm 42. Plate 40 is shaped as described with reference to the first embodiment so that it has two end portions 44a, 44b configured such that the plate 40 fits without play into the recess 22 (FIG. 5) of the valve being measured. Like the first embodiment, the arm 42 of FIGS. 6–8 is attached to plate 40 so that when the measuring device is placed in position on a valve body the surface 46 of the arm coincides with the vertical axis of the valve. Surface 46 of arm 42 is perpendicular to the plane of plate 40 whereas the opposing surface 48 forms a 91 degree angle with the plane of the plate.

The arm 42 has two chambers 70 formed therein. The chambers are centered at the center of the width of surface 48 and extend part way through the arm 42 in a direction normal to the surface 48. Within each chamber is a compression spring 72. Each spring is compressed between an end surface of its chamber and one end of a piston-like probe drive element 74.

As shown in FIG. 6, the probe drive elements may comprise two discs 74a joined together by a rectangular link 74b having a flat surface 74c.

Alternatively, the probe drive elements may comprise solid elements 74' having flat surfaces 74c' as illustrated in FIG. 9. In either case, a probe 76 extends from one end of the probe drive element to the exterior of arm 42 in a direction normal to the surface 48 of the arm.

The walls of chambers 70 are threaded in the region 78 adjacent surface 48 so that they may each receive an externally threaded probe retainer 80. Each retainer has a centrally located hole 82 (FIG. 7) extending through it, the hole 82 being just large enough to permit free reciprocal movement of a probe 76 which extends through it. Each retainer 80 is provided with a slot 84 extending diametrically across one surface so that a screwdriver or similar tool may be used to rotate it.

The measuring device is provided with two passages or bores 86, one of which is shown in FIG. 8. Each bore 86 extends from the top surface of the locator plate 40 to one of the chambers 70. The upper surface of plate 40 is provided with a recess 88 concentric with each bore 86. In addition a recess 90 is provided in support arm 42 below each chamber 70 and coaxially aligned with bore 86 to serve as a retainer bearing for the lower end of a control rod 92. The recess 90 has a diameter slightly larger than the diameter of rod 92 so that the rod may rotate therein without play.

Each control rod 92 has a cam 92a formed on, or attached to it, at a position such that when the rod 92 rests on the bottom of recess 90 the cam is positioned opposite the flat surface 74c of the probe drive element 74. Since the bore 86 must be large enough to pass the cam 92a therethrough, the control rod is provided with a centering means 92b which fits without play into the recess 88. The centering means may take the form of a collar attached to the rod 92 or it may be formed integrally with the rod. The centering means is provided with an annular recess for receiving a C-clip 94. Each control rod extends above the top surface of plate 40 and a control knob or handle 96 is attached to the upper end of the rod. Although not shown in the drawing, it is obvious from the foregoing description that the control rod 92 for locking lower probe 76 must be longer than the control rod which locks the upper probe 76.

The measuring device of FIGS. 6-8 may be assembled as follows. A compression spring 72 is inserted into a chamber 70 after which a probe drive element 74 is inserted into the chamber. A probe retainer 80 is then secured to arm 42 by inserting a probe 76 through the hole 82 in the retainer and then screwing the retainer into the arm 42. A C-clip 94 is mounted in the groove of a control rod centering means 92b and the control rod is inserted downwardly through plate 40 and arm 42 so that the lower end of the control rod fits into recess 90. As this is done, the C-clip 94 is compressed by the peripheral wall of recess 88 and the friction between the C-clip and the wall of the recess prevents the control rod from sliding out of the measuring device if the device should be inverted. The process is then repeated for the second probe and control rod.

To make a ball valve seat distance measurement, the user first applies a force to a probe 76 to compress its associated compression spring 72. While the spring is compressed, the handle 96 on the control rod is rotated to bring the cam 92a into contact with surface 74c of the probe drive element 74 to bind or lock the drive element against axial movement out of its retracted position. The same procedure is then used to lock the second probe drive element.

After the probe drive elements have been locked, the measuring device is positioned on the valve body (bonnet and working mechanism have been removed) with the plate 40 resting in the recess 22 (FIG. 5) and the probes 76 pointing directly toward the surface of a retainer seating ring 32 or 34. The handles 96 for both control rods are then turned so that cams 92a rotate out of the engagement with the probe drive elements 74. The compression springs 72 drive the probes outwardly from the support arm 42 until they contact the surface of the seating ring. The probes 76 are then locked in the extended position by turning the handles 96 to again bring cams 92a into locking contact with the surfaces 74c of the probe drive elements 74. The measuring device is then removed from the valve and, using an outside micrometer caliper, the distance is measured from the tip of each probe 76 to the surface 46 of arm 42.

The two measurements are noted and the process repeated except that the measuring device is mounted on the valve body with the probes 76 pointing toward the other seating ring. The four measurements thus taken are added together and the sum divided by two to obtain the average distance between the seating rings.

It will be understood by the foregoing description that a different measuring device must be used for each size valve since the plate 40 must be dimensioned fit without play into the bonnet recess 22 on the valve body. Also, the distances between two probes must be chosen such that the probes contact an annular ring seating ring surface at a point which is midway between the inner and outer peripheries of the seating ring.

While a preferred embodiment of the invention has been described in specific detail, it will be understood that various substitutions and modifications may be made in the described embodiment without departing from the spirit and scope of the invention as defined by the appended claims.

The embodiments of the invention in which and exclusive property or privilege is claimed are defined as follows.

I claim:

1. A measuring device for measuring the distance between seating rings in a valve body having a bonnet recess symmetrically located with respect to the axis of the valve body, said measuring device comprising:
    a locator means, dimensioned to fit without play into the bonnet recess of the valve body, for locating the measuring device relative to said valve body;
    a support arm depending from said locator means so as to extend into said valve body when said locator means is positioned in the bonnet recess;
    first and second means for probing supported by said support arm and movable relative to said support arm; and,
    means for moving said first and second means for probing into contact with a seating ring at first and second points.

2. A measuring device as claimed in claim 1, wherein each said means for probing comprises a threaded probe mounted in a threaded hole in said support arm.

3. A measuring device as claimed in claim 2, wherein said means for moving said first and second means for probing comprises thumbwheels attached to said first and second probes, respectively.

4. A measuring device as claimed in claim 3, wherein said support arm has first and second openings extending through it, each of the said openings intersecting a respective one of said respective threaded holes, said first and second thumbwheels being located in said first and second openings, respectively.

5. A measuring device as claimed in claim 3, wherein said locator means comprises a plate having first and second chordal portions connected by a bar-like portion whereby, when said locator means is positioned in the bonnet recess, a user may have access to said thumbwheels through openings between said valve body and said bar-like portion.

6. A measuring device as claimed in claim 1, wherein said support arm has a planar surface and said support arm is attached to said locator means at a position such that, when said locator means is positioned in the bonnet recess, the axis of the valve body coincides with said planar surface.

7. A measuring device as claimed in claim 6, wherein said support arm has a second planar surface which is parallel to the plane of a seating ring when said locator means is positioned in the bonnet recess.

8. A measuring device as claimed in claim 7, wherein said locator means is a plate having a flat bottom surface and second planar surface forms a 91 degree angle with respect to said flat bottom surface.

9. A measuring device as claimed in claim 7, wherein each said means for probing comprises a threaded probe mounted in a threaded hole in said support arm, said threaded holes extending into said support arm from said second planar surface in a direction normal to said second planar surface.

10. A measuring device as claimed in claim 1, wherein said means for moving said first and second means for probing comprises means comprises first and second probe drive elements mounted for reciprocal movement in first and second chambers, respectively, in said support arm, each of said means for probing comprising a probe attached to each said probe drive element and extending outwardly from said support arm.

11. A measuring device as claimed in claim 10, wherein each said chamber has a wall which is threaded in one region, said measuring device further comprising threaded retainers for retaining said probe drive elements in said chambers, said retainers each having a hole therein through which a respective one of said probes extends.

12. a measuring device as claimed in claim 10, wherein said means for moving said first and second means for probing further comprises spring means in each of said chambers for biasing the probe drive element therein in a direction to extend the probe from said support arm.

13. A measuring device as claimed in claim 12, and further comprising first and second bores extending through said locator means and said support arm to a respective one of said chambers, and control means extending through each of said bores.

14. A measuring device as claimed in claim 13, wherein each said control means comprises a control rod having a cam thereon, said cam acting against a respective one of said probe drive elements to prevent movement of said probe drive element when said control rod is rotated.

15. A measuring device as claimed in claim 14, wherein each said probe drive element has a flat surface against which said cam may act.

* * * * *